United States Patent [19]

Arika et al.

[11] Patent Number: 4,530,824

[45] Date of Patent: Jul. 23, 1985

[54] PROCESS FOR PREPARATION OF L TYPE ZEOLITES

[75] Inventors: Junji Arika, Tokuyama; Keiji Itabashi, Shinnanyo; Yoshio Tamura, Tokuyama, all of Japan

[73] Assignee: Toyo Soda Manufacturing Co., Ltd., Shinnanyo, Japan

[21] Appl. No.: 543,007

[22] Filed: Oct. 18, 1983

[30] Foreign Application Priority Data

Oct. 18, 1982 [JP] Japan ............................... 57-181408

[51] Int. Cl.³ .............................................. C01B 33/28
[52] U.S. Cl. ...................................... 423/328; 423/329
[58] Field of Search ............................... 423/328–330, 423/118; 502/60, 77

[56] References Cited

U.S. PATENT DOCUMENTS

| | | | |
|---|---|---|---|
| 3,216,789 | 11/1965 | Breck et al. | 423/328 |
| 3,481,699 | 12/1969 | Domine et al. | 423/329 X |
| 3,574,539 | 4/1971 | Domine et al. | 423/329 X |

FOREIGN PATENT DOCUMENTS 1152203  5/1969  United Kingdom ................ 423/329

OTHER PUBLICATIONS

Breck, "Zeolite Molecular Sieves" 1974, pp. 280–293.

*Primary Examiner*—Edward J. Meros
*Attorney, Agent, or Firm*—Cushman, Darby & Cushman

[57] ABSTRACT

An L type zeolite of a high purity is prepared by crystallizing an amorphous sodium alminosilicate compound containing a silicon component in an amount of 67 to 91 wt. % as $SiO_2$ on the anhydrous basis in an aqueous potassium hydroxide solution.

5 Claims, 1 Drawing Figure

PROCESS FOR PREPARATION OF L TYPE ZEOLITES

BACKGROUND OF THE INVENTION (1) Field of the Invention

This invention relates to a process for the preparation of L type zeolites which belongs to the zeolite having ε cages, i.e., cancrinite cages.

(2) Description of the Prior Art

Zeolite is a crystalline aluminosilicate containing zeolitic water, as is seen from the fact that the origin of the word "zeolite" is a Greek word "Zein" meaning "boiling stone", and the composition of zeolite is generally expressed by the following empirical formula:

$$M_{2/n}O \cdot Al_2O_3 \cdot xSiO_2 \cdot yH_2O$$

wherein M stands for a metal cation having a valency of n, x is a number of at least 2, and y is a number of at least 0.

The basic structure of zeolite comprises $SiO_4$ tetrahedrons having silicon at the center and four oxygen atoms at the apexes and $AlO_4$ tetrahedrons having aluminum at the center instead of silicon, in which the tetrahedrons are regularly and three-dimensionally arranged connected to one another, while owning oxygen atoms jointly, so that the O/(Al+Si) atomic ratio is 2. Various three-dimensional network structures differing in the size and shape of fine pores are formed according to the manner of connection of the tetrahedrons. The negative charges of the $AlO_4$ tetrahedrons are electrically neutralized by coupling with cations such as alkali metal or alkaline earth metal cations.

Fine pores thus formed have generally a size of 2-3 angstroms to ten-odd angstroms, and the size of the fine pores can be changed by exchanging the metal cations bonded to the $AlO_4$ tetrahedrons with other metal cations having a different size.

Zeolite is used as a dehydrating agent, for a gas or liquid or a molecular sieve for adsorbing specific molecules while utilizing these fine pores. Furthermore, a product obtained by exchanging the metal cation with a hydrogen ion acts as a solid acid and is utilized as a catalyst utilizing the properties of the solid acid.

A typical composition of the L type zeolite is expressed as follows:

$$(K_2,Na_2)O \cdot Al_2O_3 \cdot 6SiO_2 \cdot 5H_2O$$

and it is known that the $SiO_2/Al_2O_3$ ratio varies between 5.2 and 7.0. The crystal structure of this zeolite comprises ε cages, i.e., cancrinite cages symmetrically piled with double 6-membered rings being interposed therebetween and is characterized in that it has primary fine pores of 12-membered rings of oxygen atoms having a diameter of 7.1 angstroms.

Various processes have been proposed as the process for the synthesis of the L type zeolite. These processes, however, are not completely satisfactory.

(1) According to the process disclosed in Japanese Examined Patent Publication No. 36-3,675, a potassium-containing reaction mixture obtained by using an aqueous colloidal silica sol as the silica source is crystallized at a temperature of 100° to 200° C. for such a long time as about 64 to about 169 hours. In this process, a long time is required for the synthesis and the yield of silica is very low.

(2) As an improvement of the process (1), Japanese Examined Patent Publication No. 46-35,604 discloses a process in which reactive amorphous solid silica is used as the silica source and the crystallization is carried out at a low alkali concentration. Indeed, the yield of silica is enhanced according to this process. However, expensive reactive amorphous solid silica is indispensably used as at least 80 mole % of the silica source and, if the amount of water contained in the reaction mixture is small, a long time is necessary for the synthesis.

It is known from the above known references and other literature references that in the synthesis of the L type zeolite having ε cages (cancrinite cages) in the crystal structure or an offretite type zeolite, a potassium ion is made present in the starting material mixture so as to facilitate the synthesis. The foregoing known processes were developed under this background, and in each of these known processes, it is intended to synthesize L type zeolites at a high efficiency by using an aqueous colloidal silica sol or reactive amorphous solid silica as the silica source.

SUMMARY OF THE INVENTION

It is the primary object of the present invention to provide a process for preparing an L type zeolite whereby an L type zeolite can easily be prepared with a good reproducibility from a cheap starting material which is easy to handle.

Other objects and advantages of the present invention will be apparent from the following description.

According to the process of the present invention, an L type zeolite having a high purity is prepared by crystallizing an amorphous sodium alminosilicate (hereinafter referred to as "amorphous compound" for brevity) compound containing a silicon component in an amount of 67 to 91% by weight as $SiO_2$ on the anhydrous basis in an aqueous potassium hydroxide solution.

DESCRIPTION OF THE PREFERRED EMBODIMENTS

Figure 1:
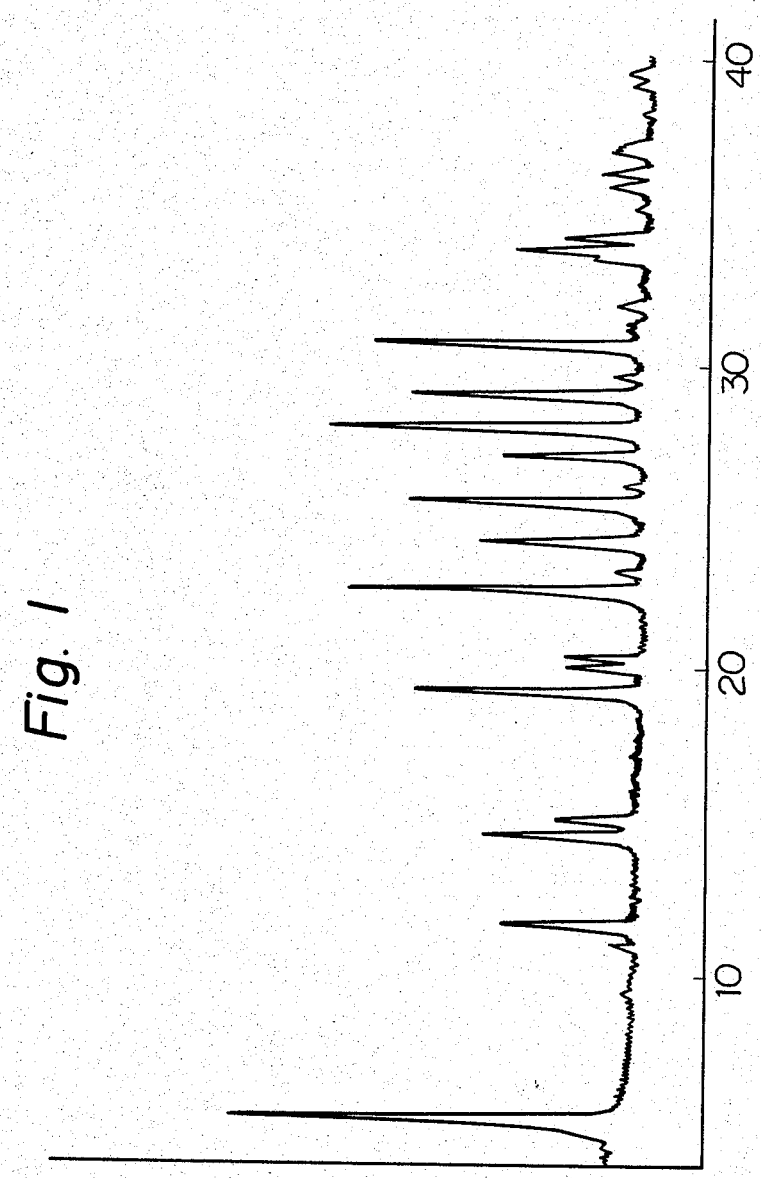
FIG. 1 is a powder X-ray diffraction diagram of the product obtained in Example 1, determined by using a Kα doublet of copper.

In the present invention, the process for obtaining the amorphous compound is not particularly critical. Namely, all the processes capable of providing amorphous compounds having a composition specified in the present invention can be utilized. For example, there can be mentioned a process comprising reacting an aqueous sodium silicate solution with an aqueous aluminum-containing solution. The present invention will now be described with reference to this process.

Commercially available water glass may be used as the aqueous sodium silicate solution in the present invention. Furthermore, an aqueous sodium metasilicate or sodium orthosilicate solution may be used. Moreover, an aqueous solution obtained by dissolving a silica source such as siliceous sand or hydrous solid silicic acid in an aqueous sodium hydroxide solution may be used. As the aqueous aluminum-containing solution, there are used aqueous solutions of aluminum sulfate, aluminum nitrate, aluminum chloride and sodium aluminate. A commercially available aqueous solution of an aluminum salt of a mineral acid or sodium aluminate may be used, or a solution obtained by dissolving an aluminum source such as activated alumina in an aqueous mineral acid or sodium hydroxide solution can be used. Sodium hydroxide or mineral acid may be added to the above-mentioned two starting aqueous solutions so as to adjust the amount of the alkali or acid. The concentrations of both the aqueous solutions are not particularly critical, but optional concentrations may be adopted.

The method for obtaining the amorphous compound by reacting both the aqueous solutions is not particularly critical. For example, there may be adopted a method in which both the aqueous solutions are continuously supplied to a reaction vessel where the aqueous solutions are reacted with stirring and a product is continuously withdrawn from the reaction vessel after a certain residence time in the vessel, a method in which the reaction is continuously carried out as in the above-mentioned method but the product is withdrawn batchwise, and a batchwise method in which the aqueous sodium silicate solution is added to the aqueous aluminum-containing solution with stirring in a batchwise manner to effect the reaction. The amorphous compound can appropriately be obtained according to any of the foregoing methods. However, in the batchwise method, the reaction product is a paste having a very high viscosity, and therefore, the concentrations of the effective ingredients should be maintained at considerably low levels in carrying out the method. In contrast, in the case where both the aqueous solutions are continuously supplied to effect the reaction, the particle size of the product can be adjusted to 1 to 500 microns, preferably 1 to 100 microns, and substantially spherical particles can be obtained though the reason is unknown. Accordingly, the viscosity of the reaction slurry is greatly reduced and the concentration of the reaction slurry can be increased without any strong agitation. As is seen from the foregoing description, for the preparation of the amorphous compound, there is preferably adopted a method in which the aqueous sodium silicate solution and the aqueous aluminum-containing solution are continuously supplied to the reaction vessel. It is preferred that the pH value of the formed reaction slurry be adjusted to 5 to 9, especially 6 to 8. The slurry obtained by reacting the aqueous sodium silicate solution with the aqueous aluminum-containing solution is subjected to solid-liquid separation whereby the amorphous compound is obtained as the solid. The solid-liquid separation is carried out by using an ordinary centrifugal separator or vacuum filter, and washing is not absolutely necessary. The thus-obtained amorphous compound is advantageously used in the form of a wet cake, but it may be used after drying.

If the spherical particles obtained according to the above-mentioned method are used for the preparation of the starting slurry to be subjected to the crystallization, even when the amount of water is extremely reduced, increase of the viscosity is not drastic. Accordingly, the yield of zeolite per unit volume can be increased and the productivity is greatly improved. This is one of the characteristic features of the present invention.

Ordinarily, the mixing ratio of the respective components of the starting materials is important for producing a pure zeolite free of impurities. Also in the above-mentioned embodiment of the present invention, the composition of the amorphous compound is appropriately determined dependent on the conditions for the reaction between the aqueous sodium silicate solution and the aqueous aluminum-containing solution, and the washing, filtration and drying conditions.

The amorphous compound used for the production of a high-quality L type zeolite according to the process of the present invention contains a silicon component in an amount of 67 to 91% by weight as $SiO_2$. If an amorphous compound having an $SiO_2$ content lower than 67% by weight on the anhydrous base is used, no L type zeolite is formed by crystallization. In contrast, if the $SiO_2$ content is higher than 91% by weight, an L type zeolite is obtained to some extent but the purity is extremely low and the yield is low, with the result that the intended object of the present invention cannot be attained. Since the amorphous compound used in the present invention is obtained by reacting aqueous solutions of the silicon source and aluminum source in the aqueous phase, the reactivity of the amorphous compound for the crystallization is much higher than those of the starting materials used in the conventional processes.

The thus-obtained amorphous compound is crystallized to an L type zeolite by heating it in an aqueous potassium hydroxide solution. In the present invention, the concentration of potassium hydroxide for the crystallization of the amorphous compound may be varied within a broad range of from 1 to 64% by weight. However, the concentration should appropriately be set according to the $SiO_2$ content in the amorphous compound and the concentration of the starting slurry for the crystallization (the weight ratio of the solid to the total amount of the starting slurry). For example, in order to obtain an L type zeolite having a high purity and a high crystallinity according to the process of the present invention, it is especially preferred that in preparing the starting slurry by adding an amorphous compound having an $SiO_2$ content of 67 to 91% by weight to an aqueous potassium hydroxide solution having a concentration of 1 to 64% by weight, the molar ratio of potassium hydroxide (KOH) to the $SiO_2$ component in the amorphous compound be adjusted within the range shown in the following table. Furthermore, it is preferred that the amount of the aqueous potassium hydroxide solution be adjusted so that the concentration of the starting slurry for the crystallization is 0.04 to 0.45% by weight.

|  | $SiO_2$ Content (% by weight) in Amorphous Compound | $KOH/SIO_2$ Molar Ratio |
| --- | --- | --- |
| Range 1 | 67–88 | 0.10–0.80 |
| Range 2 | 75–89 | 0.20–0.85 |
| Range 3 | 79–90 | 0.30–0.95 |
| Range 4 | 83–91 | 0.40–1.35 |

The amorphous compound-containing starting slurry for the crystallization is charged in an autoclave where the crystallization is carried out at a temperature of 100° to 200° C. The crystallization time is in the range of from 12 to 100 hours. After completion of the crystallization, the formed crystal is separated from the mother liquor, washed with water and then dried to obtain a crystal powder.

If desired, the L type zeolite obtained according to the present invention may be ion-exchanged with appropriate cations, and it can be used as adsorbents or catalysts in various fields as it is or after molding.

The present invention will be described in detail with reference to the following examples.

EXAMPLE 1

To an overflow type reaction vessel provided with an ordinary paddle agitator, a sulfuric acid-acidified aqueous solution of aluminum sulfate ($Al_2O_3$=44.4 g/l, $H_2SO_4$=256.9 g/l) and an aqueous sodium silicate solution ($Na_2O$=65.6 g/l, $SiO_2$=200 g/l, $Al_2O_3$=2.2 g/l) were simultaneously and continuously supplied at feed rates of 0.25 l/hr and 0.75 l/hr, respectively, and the reaction was carried out with stirring. Incidentally, an overflow outlet was provided on the reaction vessel so that 0.5 liter of the reaction liquid (slurry) was always present in the reaction vessel while the excessive slurry overflowed from the reaction vessel. The residence time of the reaction slurry was 30 minutes.

The pH value of the slurry was 6.2 and the reaction temperature was 32° C.

The slurry product overflowing from the reaction vessel was subjected to solid-liquid separation by a centrifugal separator, and the recovered solid was washed with water until $SO_4^{2-}$ ions were not detected in the washing filtrate, whereby an amorphous compound having the following composition was obtained:

$Na_2O$: 5.2% by weight (dry basis)
$Al_2O_3$: 7.13% by weight (dry basis)
$SiO_2$: 87.7% by weight (dry basis)
$H_2O$: 59.7% by weight (wet basis)

Then, 142.2 g of the thus-obtained amorphous compound was added to 176 g of an aqueous potassium hydroxide solution having a concentration of 16.4% by weight, and the mixture was stirred to form a slurry-like reaction mixture.

The reaction mixture was charged in an autoclave where it was maintained at 170° C. under the autogeneous pressure for 24 hours to effect crystallization.

After completion of the reaction, the formed solid was separated from the mother liquor by filtration, washed with water and then dried at 110° C.

From the results of the chemical analysis, it was found that the composition of the product on the anhydrous base was as follows:

$$0.99K_2O.0.01Na_2O.Al_2O_3.6.0SiO_2$$

The powder X-ray diffraction diagram of the product is shown in FIG. 1.

In a McBain-Bakr type spring balance, a part of the sample was activated at 350° C. in vacuo for 2 hours and the adsorption capacity for cyclohexane was measured. It was found that the adsorption capacity for cyclohexane was 9.1% by weight as determined at 25° C. under 46 mmHg.

EXAMPLES 2 and 3

The amorphous compound obtained in Example 1 was crystallized under conditions shown in Table 1. The powder X-ray diffraction diagram of the product was substantially the same as that shown in FIG. 1. The adsorption capacity for cyclohexane was measured in the same manner as described in Example 1. The results are shown in Table 1.

TABLE 1

|  | Example 2 | Example 3 |
|---|---|---|
| Amount (g) of Amorphous Compound | 142.2 | 142.2 |
| Aqueous Potassium Hydroxide Solution |  |  |
| Concentration (% by weight) | 59.5 | 16.4 |
| Amount (g) | 50 | 176 |
| Crystallization Conditions |  |  |
| Temperature (°C.) | 170 | 120 |
| Time (hours) | 24 | 72 |
| Adsorption Capacity (% by weight) for Cyclohexane (25° C., 46 mmHg) | 9.9 | 9.7 |

EXAMPLES 4 THROUGH 6

An amorphous compound having a composition shown in Table 2 was obtained by using a sulfuric acid-acidified aqueous solution of aluminum sulfate and an aqueous sodium silicate solution, each being shown Table 2, in the same manner as described in Example 1. The amorphous compound was crystallized under conditions shown in Table 3. The powder X-ray diffraction diagram of the product was substantially the same as that shown in FIG. 1. The cyclohexane adsorption capacity of the product was measured in the same manner as described in Example 1. The results are shown in Table 3.

TABLE 2

|  | Example 4 | Example 5 | Example 6 |
|---|---|---|---|
| Aqueous Sodium Silicate Solution |  |  |  |
| $SiO_2$ (g/l) | 280 | 200 | 160 |
| $Na_2O$ (g/l) | 92 | 83 | 83 |
| $Al_2O_3$ (g/l) | 3.1 | 2.2 | 1.8 |
| Aqueous Aluminum Sulfate Solution |  |  |  |
| $Al_2O_3$ (g/l) | 102 | 102 | 102 |
| $H_2SO_4$ (g/l) | 338 | 294 | 294 |
| Amorphous Compound |  |  |  |
| $Na_2O$ (% by weight, dry basis) | 7.8 | 8.5 | 10.1 |
| $Al_2O_3$ (% by weight, dry basis) | 10.8 | 13.1 | 15.8 |
| $SiO_2$ (% by weight, dry basis) | 76.9 | 74.6 | 73.9 |
| $H_2O$ (% by weight, wet basis) | 55.6 | 62.5 | 56.7 |

TABLE 3

|  | Example 4 | Example 5 | Example 6 |
|---|---|---|---|
| Amount (g) of Amorphous Compound | 148.7 | 199.3 | 146.7 |
| Aqueous Potassium Hydroxide Solution |  |  |  |
| Concentration (% by weight) | 31.8 | 49.6 | 35.6 |
| Amount (g) | 88 | 66 | 78 |
| Crystallization Conditions |  |  |  |
| Temperature (°C.) | 170 | 170 | 170 |
| Time (hours) | 24 | 24 | 24 |
| Cyclohexane Adsorption Capacity (% by weight, 25° C., 46 mmHg) of Product | 9.4 | 9.0 | 8.9 |

EXAMPLE 7

To 1 liter of a sulfuric acid-acidified aqueous solution of aluminum sulfate ($Al_2O_3$=48.5 g/l, $H_2SO_4$=256.5 g/l) was added 3 liters of an aqueous sodium silicate solution ($SiO_2$=200 g/l, $Na_2O$=65.6 g/l, $Al_2O_3$=0.82 g/l) with stirring to effect reaction. After completion of the addition, the mixture was further stirred for 1 hour.

The product slurry was subjected to solid-liquid separation by a centrifugal separator, and the solid phase was washed with water until $SO_4^{-2}$ ions were not detected in the washing filtrate. The product was an amorphous compound having a composition shown in Table 4.

The amorphous compound was crystallized under conditions shown in Table 5. The powder X-ray diffraction diagram of the product was subtantially the same as that shown in FIG. 1. The cyclohexane adsorption capacity of the product is shown in Table 5.

EXAMPLE 8

To a reaction vessel charged with 1 liter of water were simultaneously added 1 liter of the same aqueous aluminum sulfate solution as used in Example 7 and 3 liters of the same aqueous sodium silicate solution as used in Example 7 at rates of 33 ml/min and 100 ml/min, respectively, with stirring to effect reaction.

The formed product slurry was subjected to solid-liquid separation by a centrifugal separator, and the recovered solid was washed with water to obtain an amorphous compound having a composition shown in Table 4.

The amorphous compound was crystallized under conditions shown in Table 5. The powder X-ray diffraction diagram of the product was substantially the same as that shown in FIG. 1. The cyclohexane adsorption capacity of the product is shown in Table 5.

EXAMPLE 9

To 1 liter of a sulfuric acid-acidified aqueous solution of aluminum sulfate ($Al_2O_3$=24.0 g/l, $H_2SO_4$=162.2 g/l) was added 1 liter of an aqueous sodium silicate solution ($SiO_2$=360 g/l, $Na_2O$=118 g/l, $Al_2O_3$=1.48 g/l) with stirring to effect reaction. After completion of the addition, the mixture was further stirred for 1 hour. The product slurry was subjected to solid-liquid separation by a centrifugal separator, and the solid phase was washed with water to obtain an amorphous compound having a composition shown in Table 4.

The amorphous compound was crystallized under conditions shown in Table 5. The powder X-ray diffraction diagram of the product was substantially the same as that shown in FIG. 1. The cylochexane adsorption capacity of the product is shown in Table 5.

COMPARATIVE EXAMPLE 1

A sulfuric acid-acidified aqueous solution of aluminum sulfate ($Al_2O_3$=67.2 g/l, $H_2SO_4$=193.6 g/l) and an aqueous sodium silicate solution ($SiO_2$=66.7 g/l, $Na_2O$=54.6 g/l, $Al_2O_3$=0.27 g/l) were simultaneously and continuously supplied at rates of 0.25 l/hr and 0.75 l/hr, respectively, and an amorphous compound having a composition shown in Table 4 was prepared substantially in the same manner as described in Example 1. The amorphous compound was crystallized under conditions shown in Table 5. The product was composed mainly of adularia.

TABLE 4

|  | Example 7 | Example 8 | Example 9 | Comparative Example 1 |
|---|---|---|---|---|
| $Na_2O$ (% by weight, dry basis) | 5.1 | 4.7 | 4.2 | 14.0 |
| $Al_2O_3$ (% by weight, dry basis) | 7.22 | 6.92 | 6.31 | 21.1 |
| $SiO_2$ (% by weight, dry basis) | 87.6 | 86.0 | 89.5 | 63.0 |
| $H_2O$ (% by weight, wet basis) | 71.1 | 74.9 | 58.0 | 60.5 |

TABLE 5

|  | Example 7 | Example 8 | Example 9 | Comparative Example 1 |
|---|---|---|---|---|
| Amount (g) of Amorphous Compound | 189 | 217.2 | 384.8 | 120.5 |
| Aqueous Potassium Hydroxide Solution |  |  |  |  |
| Concentration (% by weight) | 22.4 | 28.6 | 17.3 | 17.5 |
| Amount (g) | 130 | 100 | 775 | 62 |
| Crystallization Conditions |  |  |  |  |
| Temperature (°C.) | 170 | 170 | 170 | 170 |
| Time (hours) | 24 | 24 | 24 | 24 |
| Cyclohexane Adsorption Capacity (% by weight, 25° C., 46 mmHg) | 9.2 | 9.3 | 9.3 | — |

We claim:

1. A process for the preparation of L type zeolites, which comprises crystallizing an amorphous sodium aluminosilicate compound containing a silicon component in an amount of 67 to 91% by weight as $SiO_2$ on the anhydrous basis in an aqueous potassium hydroxide solution,
    said amorphous sodium aluminosilicate compound having a particle size of 1 to 500 microns and being obtained by reacting an aqueous sodium silicate solution with an aqueous aluminum-containing solution while both the aqueous solutions are simultaneously and continuously supplied to a reaction vessel and the pH value of the reaction product is maintained in the range of from 5 to 9.

2. A process according to claim 1, wherein the amount of the aqueous potassium hydroxide solution is such that a starting slurry for the crystallization has a concentration of 0.04 to 0.45% by weight.

3. A process according to claim 1, wherein the molar ratio of potassium hydroxide to the $SiO_2$ component in the amorphous compound is in the range of from 0.10 to 1.35.

4. A process according to claim 1, wherein the crystallization is carried out at a temperature of from 100° to 200° C.

5. A process according to claim 4, wherein the crystallization is carried out for a period of from 12 to 100 hours.

* * * * *